April 17, 1956     E. J. HOUDRY     2,742,437

CATALYTIC STRUCTURE AND COMPOSITION

Filed Sept. 29, 1952

INVENTOR.
EUGENE J. HOUDRY
BY
Buster and Harding
ATTORNEYS.

United States Patent Office 2,742,437
Patented Apr. 17, 1956

2,742,437

CATALYTIC STRUCTURE AND COMPOSITION

Eugene J. Houdry, Ardmore, Pa., assignor to Oxy-Catalyst, Inc., a corporation of Pennsylvania Application September 29, 1952, Serial No. 312,152

15 Claims. (Cl. 252—455)

This invention relates to a novel catalytic structure, and in particular is concerned with a catalytic structure adapted for use in catalytic oxidation reactions and capable of sustained activity and durability under severe operating conditions.

This application is a continuation-in-part of copending applications Ser. No. 95,031 filed May 24, 1949, now abandoned, by Eugene J. Houdry for Catalytic Structure and Composition, and Ser. No. 160,180, filed May 5, 1950, now Patent No. 2,674,521, by Eugene J. Houdry for Catalytic Apparatus to Render Non-Poisonous Exhaust Gases from Internal Combustion Engines.

A great variety of oxidation catalysts have been proposed in the past, differing widely from one another both in their chemical composition and physical structure. With respect to chemical composition, the ability of a large number of metals and metal oxides, either alone or in combination, to catalyze oxidation reactions has been recognized. The following metals, and/or their oxides, have for example, been mentioned as components of oxidation catalysts: beryllium, cerium, chromium, cobalt, iridium, copper, iron, lead, lithium, magnesium, manganese, molybdenum, nickel, palladium, platinum, ruthenium, silver, thorium, tin, titanium, tungsten, vanadium, zinc and zirconium. With respect to physical structure, previously known oxidation catalysts similarly exist in great variety. They have, for example, been employed in pellet or granular form without the use of any support or carrier. More often perhaps, the catalytically active portion of the catalyst is supported upon porous carriers or supports which may, or may not, contribute to the catalytic activity of the composite structure. Many previously proposed oxidation catalysts, for example, consist of a porous gel, such as alumina or silica gel, or a porous refractory substance, such as asbestos, impregnated with a catalytically active metal, such as silver or platinum.

While many of these known oxidation catalysts perform successfully under relatively mild operating conditions or in specific applications under careful control, there has long been a need for an oxidation catalyst of high and sustained activity which is rugged enough, physically and chemically, to withstand extremely severe operating conditions over long periods of time. Specifically, a catalyst is needed which is capable of preserving its physical stability and maintaining high activity under conditions where it is exposed to continuous and relatively severe mechanical shock; where it is exposed to wide variations in temperature, including relatively high temperatures of from 1000° F. up to 2000° F.; and where other conditions of operation such as the space velocity of the reactants through the catalyst continually or intermittently undergo wide variation. The catalyst should, furthermore, be highly resistant to contamination and chemical poisoning so as to permit its use for the oxidation of mixtures of a wide variety of substances.

In accordance with the present invention, an oxidation catalyst is provided which possesses all of the above desirable qualities in a high degree. The catalytic structure provided by the invention opens up fields of application for catalytic oxidation which, as a practical matter, have previously been considered closed because of a lack of a suitable oxidation catalyst. The use of oxidation catalysts for the elimination of exhaust fumes from internal combustion engines has, for example, been suggested many times in the past, but up to the present time has never been proven a commercial possibility because of the lack of a sufficiently active and durable oxidation catalyst. This, and many other applications of catalytic oxidation are brought within the realm of commercial possibility by this invention.

Broadly speaking, the catalytic structure provided by the present invention, consists of a shaped support composed of a catalytically inert, thermally resistant, substantially impervious material, such as substantially impervious porcelain of the type, for example, used in spark plug construction. On the external surface only of the shaped support a catalytically active metal oxide, such as catalytically active alumina, is deposited as a thin, tightly adherent, superficial film, having a maximum thickness of about .015". This thin, catalytically active film of metal oxide is impregnated with a catalytically active metal, such as platinum, which in conjunction with the metal oxide is capable of catalyzing oxidation reactions.

In this catalytic structure, the shaped support serves purely as a mechanical carrier for the film of catalytically active material which is deposited on its external surface. It supplies a physically strong, mechanical structure which ordinarily is very large in size and weight in contrast to the catalytic material which it carries, and which, in accordance with the preferred embodiment of the invention, is of such size and shape that it may be mounted in the reaction space in such a manner as to maintain the film of catalytically active material out of contact with neighboring surfaces. This latter is an important feature because of the extreme thinness, relatively speaking, of the catalytic film and its consequent susceptibility to be readily removed by abrasion. If, for example, the shaped support, with its thin, superficial film of catalyst were dumped at random into a reaction chamber in contact with similar catalytic elements, the resultant rubbing of the surfaces of the elements over and upon one another would quickly remove the active film of catalyst, leaving only the catalytically inert support.

In addition to being, for all practical purposes, completely devoid of any catalytic activity, the shaped support should furthermore be chemically inert with respect to the film of catalytically active material carried thereby. There should be no tendency for the material of the support to react with the catalytic film since this will invariably lead to a loss or diminution of activity.

While it is not necessary that the material making up the support be absolutely impervious, it should at least be sufficiently nonporous that the catalytically active material is carried almost entirely on the external surface of the support as a thin, superficial film, rather than deposited in pores within the body of the support as in the case of many conventional catalysts. As a matter of fact, a slight surface porosity is advantageous in that it permits better adhesion of the catalytic film, and the term "substantially impervious" is not intended to exclude such slight porosity provided the pores are not sufficiently large to permit the catalytically active material to impregnate the body of the support.

To permit use of the catalyst at relatively high temperatures, the material making up the support must also, of course, be thermally resistant, that is, capable of maintaining its physical shape and strength when exposed to high temperatures for long periods of time, and when exposed to rather rapid and wide fluctuations in temperature. Furthermore the support should be of a material having a coefficient of expansion which is similar to, or substantially the same as, the catalytically active film.

Without this characteristic, the thin catalytic film rapidly flakes off under repeated contractions and expansions.

An excellent example of a suitable material out of which the shaped support may be constructed is a dense, substantially impervious porcelain of the type, for example, of which spark plugs or high quality burner tips are made. As is well known, this type of material has a high softening point, ordinarily above 2500° F., has a dense structure, and a high resistance to spalling. It is physically strong and is able to withstand repeated physical and thermal shocks. It has a coefficient of expansion quite similar to, or almost identical to, the catalytically active film of metal oxide deposited upon its surface in accordance with the invention, and accordingly, the catalytic film is not affected by repeated heating and cooling.

The chemical and physical constitution of this type of porcelain and methods of its manufacture are well known and thus need not be described in detail here. It is usually made from silica and alumina derived from natural clays or synthetic sources, sometimes containing a small amount of flint. The proportion of alumina is usually predominant. It is made by firing the molded clay to a high temperature of from 2000° F. up to 3900° F., causing sintering and partial fusion of its constituents and apparently considerable chemical combination between them. The partial fusion caused by the high temperature firing produces a material that is much more dense and impervious than the usual clay product subjected to low temperature baking.

Because of the high degree of suitability of this type of porcelain, a catalytic structure having a support composed of this material gives consistently excellent results and constitutes therefore, a preferred embodiment of the invention. Other materials, however, having qualities similar to, or equivalent to, this type of porcelain, particularly qualities such as high softening point and a suitable coefficient of expansion, are included within the scope of the invention. It is, of course, apparent that the material making up the support may itself be supported by some other material. For example, a metal tube or other structure may be provided with a coating of dense porcelain, and the thin, catalytic film of the invention then deposited upon this porcelain coating.

Suitable catalytically active metal oxides making up the thin, superficial film deposited on the external surface of the support include catalytically active alumina in particular and less preferably catalytically active thoria, magnesia and beryllia. As is well known in the art, in order for these oxides to have catalytic activity they must exist in, or be prepared in, a special form. Alumina for example is known to have several crystalline forms, including the so-called gamma alumina and alpha alumina. The gamma form is catalytically active, while the alpha form is substantially inert. As is well known, gamma alumina may be prepared by heating precipitated aluminum hydroxide or by decomposing an aluminum salt, such as aluminum nitrate, at a temperature of about 800° F. to 1000° F. Likewise, it is well known that when gamma alumnia is heated above about 2100° F., it becomes the trigonal crystalline oxide or alpha alumina, possessing no catalytic activity. Thus, while a porcelain support may contain alumina or magnesia, it possesses no catalytic activity because of the high temperature to which it has been subjected.

One suitable method for producing a tightly adherent film of the metal oxide on the shaped support is to dip the support into a solution of the appropriate salt such as a solution of an aluminum, magnesium or beryllium salt and then to decompose the salt by heat. Under these conditions a firmly adherent film of active alumina, beryllia or magnesia is deposited on the surface of the porcelain or other suitable support. Using this method, several successive dippings and subsequent decompositions are necessary to produce a film of sufficient thickness.

Another suitable method for producing the film of metal oxide is described in U. S. Patent 2,580,806, issued January 1, 1952, to Louis E. Malina for Deposition of a Metal Oxide Catalyst on a Carrier. This method, which has the advantage of producing a relatively thick film in one dipping operation, involves dipping the shaped support into a solution of a salt of the appropriate metal which contains finely divided particles of the corresponding metal oxide dispersed therein, followed by decomposition of the salt by heat to deposit a film of the oxide. According to this method, for example, the support may be dipped into a solution of aluminum nitrate containing particles of finely divided, catalytically active alumina. After drying, and upon heating, the aluminum nitrate decomposes into active alumina, and together with the finely divided alumina deposited during the dipping forms a tightly adherent film of catalytically active alumina. Using this method, films of the proper thickness, for example, of from .001" to .006" may be prepared in a single dipping and decomposition operation.

The thickness of the superficial film of metal oxide is of great importance particularly with respect to the long life and sustained activity of the catalyst. It should be at least about .0005" thick, which, depending upon the particular metal oxide in question, corresponds to about 1 to 3 milligrams of metal oxide per square centimeter of surface of the shaped support. It should have a maximum thickness of about .015". Films of greater thickness than this have a tendency to crack and flake off the support in use, which of course quickly reduces or destroys catalytic activity. Preferably, the thickness of the film is about .001" to about .006". Films in this preferred range of thickness have no tendency to flake, and when impregnated with a catalytically active metal, provide a catalyst of high activity which may be exposed continuously to the most rigorous operating conditions for months at a time without loss or diminution of activity. When films having a thickness below about .001" are used, particular care should be taken in the chemical composition of the support. If a porcelain support is employed, for example, which contains free, i. e., uncombined silica, it is possible for the silica to penetrate and poison the entire thickness of the film (by reaction with the catalytically active alumina, for example). With thicker films, the chemical composition of the support is less critical.

To complete the oxidation catalyst, the film of catalytically active metal oxide of the proper thickness is impregnated with a catalytically active metal capable, in conjunction with the metal oxide, of catalyzing oxidation reactions. Suitable metals for this purpose include, preferably, platinum, ruthenium, palladium, silver, and copper, or combinations such as silver-chromium, copper-chromium, and copper-manganese. Cobalt and nickel are also suitable, but less desirable in that their activity is more readily affected by the presence of sulfur containing compounds in the stream of reactants passing through the catalyst. Other metals, such as iron, chromium, lead and manganese display some oxidation activity but are generally much less active than the metals listed above. The above metals may exist in the catalyst initially or during use either in the metallic state or in an oxidized condition, and it is to be understood that the term "catalytically active metal" is intended to include the metal in either or both the reduced or oxidized state. It is often difficult or impossible, particularly during use, to determine in precisely what condition the metal actually exists. It is quite likely that, in some cases at least, it is continually undergoing oxidation and reduction during use. In contrast, the metal oxide (alumina, thoria, beryllia, magnesia) making up the thin film, is a stable oxide and very probably remains in the oxidized condition at all times during use.

The impregnation of the film of active metal oxide with the catalytically active metal may be accomplished by any of the methods well known in the art. A satisfactory method is, for example, to dip the support, with its adherent film of metal oxide, into a solution of a salt of the appropriate metal, such as a solution of a platinum salt. After decomposition of the salt by heat, the film is impregnated with the metal or its oxide in a very finely divided condition. A single dipping is generally sufficient to deposit the desired amount of catalytically active metal in the base film.

The proportion of the catalytically active metal to the film of metal oxide is important with respect to the activity and durability of the catalyst. In all cases, the film of metal oxide should be impregnated with a minor amount by weight of the catalytically active metal based on the weight of the metal oxide film. In most cases, the weight of the catalytically active metal based on the metal oxide film should not exceed 30%. The minimum amount of catalytically active metal required to produce a reasonably active catalyst varies of course with the particular metal employed. A much smaller amount of platinum, for example, is required to give equivalent activity as compared to a less active metal such as silver or copper.

In the following table, a number of illustrative examples are given of various combinations of alumina, thoria, beryllia and magnesia impregnated with various amounts of catalytically active metals which have proven successful.

| Active Metal Oxide | Catalytically active Metal, Percent by Weight Based on Active Metal Oxide |
| --- | --- |
| Active Alumina | .01, .05, .025, .01, 0.1, 1.0, 5% and 10% platinum. |
| Do | .15% platinum and 6.6% manganese. |
| Do | 10% silver. |
| Do | 6.6% silver and 3.3% chromium. |
| Do | 6.6% silver-chromate. |
| Active Thoria | 20% platinum. |
| Active Beryllia | 1 to 8% platinum. |
| Do | 1 to 5% palladium. |
| Do | 2.5% to 7.5% platinum and 2.5% to 7.5% palladium. |
| Do | 1 to 5% ruthenium. |
| Do | 5% iridium. |
| Active Magnesia | 10% platinum. |

With a costly metal, such as platinum, or palladium, it is of course desirable to use as little of the metal as possible to obtain reasonably high activity. An alumina film impregnated with about 1% to 2% by weight of platinum, based on the alumina, gives very satisfactory results because of the high activity of platinum. With less active metals, such for example as silver and copper, a greater proportion of the metal may be necessary, such as 5% or 10% based on the weight of the active metal oxide film. In many cases, the activity of the catalyst actually begins to fall off as the proportion of catalytically active metal to the metal oxide film increases beyond a certain point and in most cases when the proportion of metal exceeds about 30% there is a danger that the base film may be rapidly destroyed while in use due to the crumbling of the film from the surface of the support.

Reference is now made to the accompanying drawings which illustrate several types of shaped supports which may be employed in accordance with the invention. The supports illustrated are composed of porcelain of the type commonly used in spark plugs or in high quality burner tips, which, as is well known, is a physically strong, dense, substantially impervious procelain having a high softening point.

Figure 1:
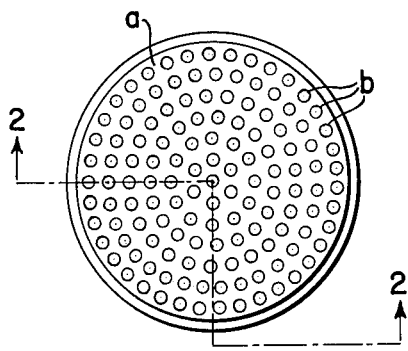
Fig. 1 is a plan view of such a porcelain support, consisting of a disc *a* perforated with holes *b*.
Figure 3:
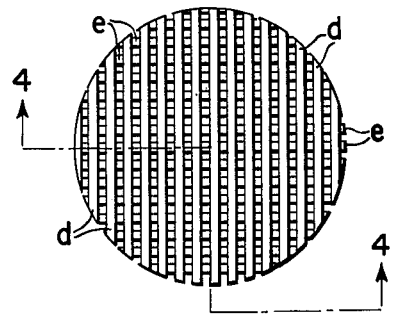
Fig. 3 is a plan view of another type of porcelain support consisting of a disc *c* provided with deep slots *d* and *e* respectively on opposite faces, the slots on opposite faces being at right angles to one another and of such depth that they meet so as to provide openings for the flow of gases through the disc.
Figure 2:
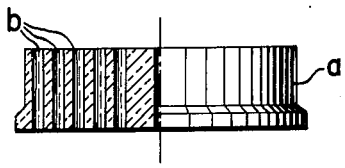
Fig. 2 is a section on the line 2—2 of Fig. 1.
Figure 4:
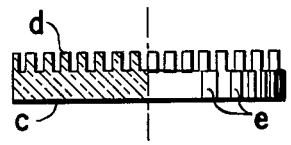
Fig. 4 is a section on the line 4—4 of Fig. 3.
Figure 5:
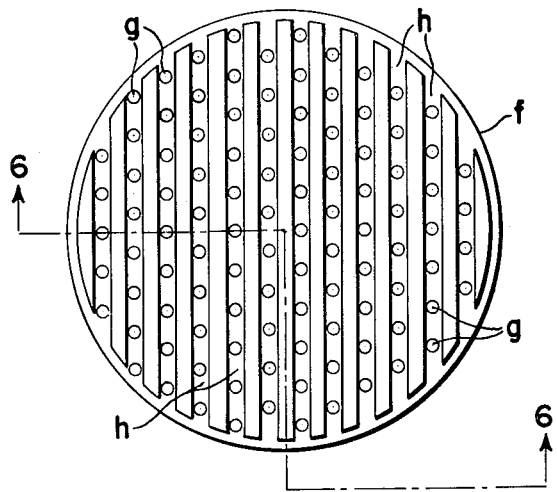
Fig. 5 is a plan view of still another type of porcelain support consisting of a disc *f* having a series of slots *h* formed on opposite faces and holes *g* drilled through the disc.
Figure 6:
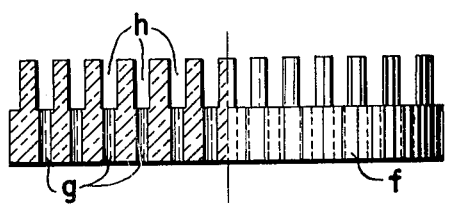
Fig. 6 is a section on the line 6—6 of Fig. 5.

On the external surfaces of the shaped supports illustrated, the catalytically active film is disposed. Because of the thinness of this film relative to the massiveness of the support, it is impracticable to illustrate, with any approach to accuracy, the thickness of this film relative to the support, and consequently no attempt to do so has been made.

It is of course obvious that supports of shapes other than those specifically illustrated may be employed, such as a support in the shape of a cylinder or a rod. As previously mentioned, it is extremely desirable, and in most cases a necessity that the support be of such size and shape as to be adapted for mounting in a reaction space such that the thin, catalytically active film carried thereby may be maintained out of contact with surrounding surfaces. A suitable method for thus mounting the shaped support is shown, for example, in copending application, Serial Number 160,180, referred to above. In this particular structure, which is particularly suited for cleaning the exhaust fumes of internal combustion engines, a number of porcelain supports in the form of perforated discs provided with a thin film of catalytically active material are mounted at closely spaced intervals around the circumference of a conduit, the conduit itself being maintained in spaced relationship to its housing. In this fashion, the thin film of active material on the surface of the porcelain supports is maintained out of contact with neighboring objects and thus cannot be removed by abrasion.

When thus protected from abrasion, the thin film of catalyst is extremely durable. It is unaffected by repeated and relatively violent mechanical shock, and in fact will withstand any sort of jarring or shock which does not result in breakage of the support itself. Repeated and relatively rapid changes in temperature do not disturb or dislodge the film so long as the material of the underlying support itself is not damaged. In contrast, prior oxidation catalysts are ordinarily quite sensitive to both mechanical and thermal shock, and when exposed to such conditions quickly crumble into powder.

Should the activity of the thin film of catalyst become impaired after long periods of use, it can be readily removed from the surface of the support by chemical or mechanical means, leaving the support in a suitable condition for reuse. This is a valuable feature of the invention since in most cases, such as in the case of a high quality porcelain support, the shaped support is more costly than the film of catalytically active material deposited thereon.

In spite of the fact that the film of catalytically active material is relatively very thin (which of course means that per unit of external surface area, the amount of catalytically active material employed is very small) the catalytic structure provided by the invention displays an activity which in many cases exceeds the activity of catalysts of similar chemical composition and of equivalent surface area which are constructed in accordance with prior methods, although these prior catalysts may contain much greater quantities of catalytically active material.

As mentioned previously, the oxidation catalyst provided by this invention permits the application of catalytic oxidation in a wide variety of fields where such application has been previously commercially impossible because of the lack of an active and rugged oxidation catalyst. One advantageous application of the catalytic structure provided by the invention, which has been previously mentioned, is for catalytically oxidizing the exhaust fumes of internal combustion engines, with or without utilization of the heat thus produced. With the use of the catalyst, the carbon monoxide and ill smelling fumes contained in these gases are almost entirely eliminated. The use of the catalyst for this purpose is, for example, described in copending application 160,180, previously referred to, and in copending application 167,856, filed June 13, 1950 by Eugene J. Houdry for Treatment of Exhaust Gases of Internal Combustion Engines. Another advantageous use for the catalytic structure provided by the invention is in the production of heat and power entirely by means of catalytic oxidation, using any desired type of gaseous or vaporizable fuel. The use of catalytic oxidation for this purpose permits the recovery of substantially 100% of the heat content of the fuel, a substantial portion of which is often wasted in ordinary combustion processes. In order to be commercially practicable, such an application of catalytic oxidation requires the use of an oxidation catalyst such as provided by the present invention capable of operation at high temperatures for very long periods of time. A catalyst made in accordance with the invention and having a film of active alumina impregnated with a small amount of platinum will operate continuously for months at temperatures in the neighborhood of 500° F. to 2000° F.

In connection with the production of heat and power, the use of catalytic oxidation for this purpose has its greatest advantages when the fuel mixture is outside the limits of inflammability. In many industries, for example, fumes are produced in large volumes containing combustible substances which are present in such small concentrations that the fumes are outside the limits of inflammability. Usually, these fumes are vented to the atmosphere, which results in a complete waste of their heat content and furthermore often creates serious air pollution problems. The off gases from oil refinery operations, such as the regeneration fumes produced during catalytic cracking operations, usually fall into this category. Likewise, the fumes from enamelling ovens, containing small concentrations of hydrocarbon solvents are usually outside the limits of inflammability and consequently cannot be burned by ordinary methods. The use of catalytic oxidation by means of an active and rugged oxidation catalyst provides a practical means for the recovery of substantially the entire heat content of fumes of this sort, and at the same time, eliminates serious air pollution problems by converting the fumes into harmless inert gases.

Still another useful application for the catalytic structure provided by the present invention is for the production of the motive fluid for engines of the internal combustion type. Such an application is described in detail in copending applications Serial No. 783,561, filed November 1, 1947, now Patent No. 2,624,172, Ser. No. 790,214, filed December 6, 1947, now abandoned, and Ser. No. 790,215, filed December 6, 1947, now Patent No. 2,632,297. As described in these applications, the oxidation catalyst is supplied with a fuel-air mixture which is outside the limits of inflammability and the motive fluid thus produced is employed to drive the power driven element which may be a turbine blade in case of a gas turbine, or a piston in the case of a piston engine.

As contrasted to conventional internal combustion engines which run on air-fuel mixtures in such proportions as to be always within the limits of inflammability, the catalytic oxidation of non-inflammable mixtures provides a number of important advantages. It permits the use of very high compression ratios while using low grade fuels. In fact, since the problem of detonation is no longer present, the notions of octane or cetane number become completely meaningless. In the case of a piston engine particularly, the use of an oxidation catalyst to release the latent energy of the fuel-air mixture, instead of the conventional spark-fired combustion method, permits full combustion efficiency at all times. As is well known, in spark-fired piston engines, maximum efficiency is obtained only in a narrow band of operating conditions. The variation in efficiency is such that under ordinary average driving conditions, an automobile engine only recovers about 15% of the energy of the fuel utilized. With the use of the oxidation catalyst provided by the invention in the manner set out in the above applications, fuel savings of from 30% to 50% are possible.

It is understood, of course, that the above described useful applications of the catalyst provided by the invention are intended merely to be illustrative of the many fields in which the catalyst finds application. It is obvious, of course, that many other applications are possible, and that the catalytic structure provided by the present invention is not limited to any particular use.

I claim:

1. A catalytic structure comprising a physically strong, shaped support composed of a catalytically inert, substantially impervious material, a catalytically active metal oxide deposited on the external surface only of said support as a thin, tightly adherent, superficial film having a thickness of not less than .0005" and not more than .015", said film of metal oxide being impregnated with a minor amount by weight, based on said metal oxide, of a finely-divided catalytically active metal, said support being of such size and shape as to be adapted for mounting in a reaction space with said thin, catalytically active film out of contact with neighboring surfaces.

2. A catalytic structure comprising a physically strong, shaped support composed of a catalytically inert, substantially impervious material, a catalytically active metal oxide deposited on the external surface only of said support as a thin, tightly adherent, superficial film having a thickness of from about .001" to .006", said film of metal oxide being impregnated with a minor amount by weight, based on said metal oxide, of a finely divided catalytically active metal.

3. A catalytic structure adapted for use in catalytic oxidation reactions and capable of sustained activity and durability under severe conditions of operation, comprising a physically strong, shaped support composed of a catalytically inert, thermally resistant, substantially impervious material, a catalytically active metal oxide deposited on the external surface only of said support as a thin, tightly adherent, superficial film having a thickness of not less than about .0005" and not more than .015", said film of metal oxide being impregnated with a minor amount by weight, based on said metal oxide, of a finely divided, catalytically active metal capable, in conjunction with said film of metal oxide, of catalyzing oxidation reactions, said support being of such size and shape as to be adapted for mounting in a reaction space with said thin, catalytically active film out of contact with neighboring surfaces.

4. A catalytic structure adapted for use in catalytic oxidation reactions and capable of sustained activity and durability under severe conditions of operation, comprising a physically strong, shaped support composed of a catalytically inert, thermally resistant, substantially impervious material, a catalytically active metal oxide deposited on the external surface only of said support as a thin, tightly adherent, superficial film having a thickness of .001" to .006", said film of metal oxide being impregnated with a minor amount by weight, based on said metal oxide, of a finely divided catalytically active metal capable, in conjunction with said film of metal oxide, of catalyzing oxidation reactions.

5. A catalytic structure adapted for use in catalytic oxidation reactions and capable of sustained activity and durability under severe operating conditions, comprising a physically strong, shaped support of substantially impervious porcelain, a catalytically active metal oxide deposited on the external surface only of said support as a thin, tightly adherent superficial film having a thickness of from .001" to .006", said film of metal oxide being impregnated with a minor amount by weight, based on said metal oxide, of a finely divided, catalytically active metal capable, in conjunction with said film of metal oxide, of catalyzing oxidation reactions, said support being of such size and shape as to be adapted for mounting in a reaction chamber with said thin, catalytically active film out of contact with neighboring surfaces.

6. A catalytic structure adapted for use in catalytic oxidation reactions and capable of sustained activity and durability under severe operating conditions, comprising a physically strong, shaped support composed of a catalytically inert, thermally resistant, substantially impervious material, a catalytically active metal oxide selected from the group consisting of catalytically active alumina, thoria, magnesia, and beryllia deposited on the external surface only of said support as a thin, tightly adherent, superficial film having a thickness of not less than .0005" and not more than .015", said film of metal oxide being impregnated with a minor amount by weight, based on said metal oxide, of a finely divided, catalytically active metal capable, in conjunction with said film of metal oxide, of catalyzing oxidation reactions, said support being of such size and shape as to be adapted for mounting in a reaction space with said thin, catalytically active film out of contact with neighboring surfaces.

7. A catalytic structure adapted for use in catalytic oxidation reactions and capable of sustained activity and durability under severe operating conditions, comprising a physically strong, shaped support composed of substantially impervious porcelain, a catalytically active metal oxide selected from a group consisting of alumina, thoria, magnesia, and beryllia, deposited on the external surface only of said support as a thin, tightly adherent, superficial film having a thickness of from .001" to .006", said film of metal oxide being impregnated with a minor amount by weight, based on said metal oxide, of a finely divided, catalytically active metal capable, in conjunction with said film of metal oxide, of catalyzing oxidation reactions, said porcelain support being of such size and shape as to be adapted for mounting in a reaction space with said thin, catalytically active film out of contact with neighboring surfaces.

8. A catalytic structure adapted for use in catalytic oxidation reactions and capable of sustained activity and durability under severe operating conditions, comprising a physically strong, shaped support composed of a catalytically inert, thermally resistant, substantially impervious material, a catalytically active metal oxide selected from the group consisting of alumina, thoria, magnesia, and beryllia deposited on the external surface only of said support as a thin, tightly adherent, superficial film, having a thickness of from about .001" to .006", said film of metal oxide being impregnated with a minor amount by weight, based on said metal oxide, of a finely divided, catalytically active metal, selected from the group consisting of platinum, ruthenium, palladium, silver, copper, silver-chromium, copper-chromium, copper-manganese, nickel and cobalt.

9. A catalytic structure adapted for use in catalytic oxidation reactions and capable of sustained activity and durability under relatively severe operating conditions, comprising a physically strong, shaped support composed of a catalytically inert, thermally resistant, substantially impervious material, a catalytically active metal oxide selected from the group consisting of alumina, thoria, magnesia, and beryllia deposited on the external surface only of said support as a thin, tightly adherent, superficial film having a thickness of .001" to .006", said film of metal oxide being impregnated with a minor amount by weight, based on said metal oxide, of a finely divided, catalytically active metal selected from the group consisting of platinum, ruthenium, palladium, silver, copper, silver-chromium, copper-chromium, copper-manganese, nickel and cobalt, said support being of such size and shape as to be adapted for mounting in a reaction space with said thin, catalytically active film out of contact with neighboring surfaces.

10. A catalytic structure in accordance with claim 9 in which said film of metal oxide is impregnated with less than 30% by weight based on said metal oxide of said finely divided, catalytically active metal.

11. A catalytic structure adapted for use in catalytic oxidation reactions and capable of sustained activity and durability under severe operating conditions comprising a physically strong, shaped support of substantially impervious porcelain, a catalytically active metal oxide selected from the group consisting of alumina, thoria, magnesia, and beryllia, deposited on the external surface only of said support as a thin, tightly adherent, superficial film having a thickness of not less than about .0005" and not more than .015", said film of metal oxide being impregnated with a minor amount by weight, based on said metal oxide, of a finely divided, catalytically active metal selected from the group consisting of platinum, ruthenium, palladium, silver, copper, silver-chromium, copper-chromium, copper-manganese, nickel, and cobalt, said support being of such size and shape as to be adapted for mounting in a reaction space with said thin, catalytically active film out of contact with neighboring surfaces.

12. A catalytic structure adapted for use in catalytic oxidation reactions and capable of sustained activity and durability under severe operating conditions comprising a physically strong, shaped support of substantially impervious porcelain, a catalytically active metal oxide selected from the group consisting of alumina, thoria, magnesia, and beryllia, deposited on the external surface only of said support as a thin, tightly adherent, superficial film having a thickness of .001" to .006", said film of metal oxide being impregnated with a minor amount by weight, based on said metal oxide, of a finely divided, catalytically active metal selected from the group consisting of platinum, ruthenium, palladium, silver, copper, silver-chromium, copper-chromium, copper-manganese, nickel and cobalt, said support being of such size and shape as to be adapted for mounting in a reaction space with said thin, catalytically active film out of contact with neighboring surfaces.

13. A catalytic structure in accordance with claim 12 in which said film of metal oxide is impregnated with less than 30% by weight based on said metal oxide of said finely divided, catalytically active metal.

14. A catalytic structure adapted for use in catalytic oxidation reactions and capable of sustained activity and durability under severe operating conditions comprising a physically strong, shaped support of substantially impervious porcelain, catalytically active alumina deposited on the external surface only of said support as a thin, tightly adherent, superficial film having a thickness of from about .001" to .006", said film of alumina being impregnated with a minor amount by weight, based on said alumina, of finely divided platinum, said porcelain support being of such size and shape as to be adapted for mounting in a reaction space with said thin, catalytically active film out of contact with neighboring surfaces.

15. A catalytic structure in accordance with claim 14 in which said film of alumina is impregnated with less than about 2% by weight, based on said alumina, of finely divided platinum.

References Cited in the file of this patent

UNITED STATES PATENTS

| | | |
|---|---|---|
| 1,043,580 | Eldred | Nov. 5, 1912 |
| 1,796,501 | Berl | Mar. 17, 1931 |
| 1,939,647 | Arnold et al. | Dec. 19, 1933 |
| 2,045,632 | Colby | June 30, 1936 |
| 2,128,457 | Fairchild | Aug. 30, 1938 |
| 2,242,627 | Strickland | May 20, 1941 |
| 2,487,466 | Nahin | Nov. 8, 1949 |
| 2,580,806 | Malina | Jan. 1, 1952 |